United States Patent Office 3,285,937
Patented Nov. 15, 1966

3,285,937
3,3-DIALKYL-2-ALKOXY-2,3-DIHYDROBENZO-
FURAN-5-OLS AND DERIVATIVES THEREOF
Kent C. Brannock and Robert D. Burpitt, Kingsport,
Tenn., assignors to Eastman Kodak Company, Rochester, N.Y., a corporation of New Jersey
No Drawing. Filed Dec. 9, 1963, Ser. No. 329,267
13 Claims. (Cl. 260—346.2)

This invention relates to novel organic compounds useful as antioxidants for edible and other fats and oils—also as photographic developers and as fungicides, and more particularly to 3,3-dialkyl-2-alkoxy - 2,3 - dihydrobenzofuran-5-ols and to a process for preparing such compounds. The invention also relates to the production of acetals from 3,3-dialkyl-2-alkoxy-2,3-dihydrobenzofuran - 5 - ols which themselves may be converted to the 3,3-dialkyl-2-alkoxy-2,3-dihydrobenzofuran-5-ols.

So far as we are aware, the 3,3-dialkyl-2-alkoxy-2,3-dihydrobenzofuran-5-ols herein described are new chemical compounds. However, in order to indicate the novelty of such compounds as compared to certain related compounds of the prior art the following brief discussion is given.

U.S. Patent 2,535,058 discloses 2,3-dihydrobenzofuran-5-ol (or 5-hydroxy coumaran) derivatives, (e.g., 2,2-dimethyl-5-hydroxy coumaran, 2-methyl-6-tert-butyl-5-hydroxy coumaran and the like. Similar 5-hydroxy coumaran derivatives are disclosed in U.S. Patent 2,320,746 and U.S. Patent 2,738,281. As will be more fully set forth hereinafter, the compounds of the present invention are distinguished from the 2,3-dihydrobenzofuran-5-ols (or 5-hydroxy coumarans) of U.S. 2,535,058, U.S. 2,320,746 and 2,738,281 by the fact that they contain 2-alkoxy substituents, and effectively therefore an acetal-type carbon atom at the 2-position. This different substitution at the 2-position confers novel and unexpected properties to the compounds of my invention as compared to those of the prior art. We believe that the 2-alkoxy group is essential for the proven activity of my compounds as photographic developers and as fungicides.

In the copending application of Kent C. Brannock and Herman S. Pridgen, Serial No. 257,873, filed February 12, 1963, now Patent 3,184,457 of May 18, 1965, entitled, "2-Aminobenzofuran(2H)-5-ols and a Process of Making Them," assigned to Eastman Kodak Company, there are disclosed certain dialkyl amino derivatives of 2,3-dihydrobenzofuran-5-ols and a process of synthesizing such compounds by treating a quinone with an enamine. These compounds are similar to the compounds of the present invention except that the 2-dialkylamino group is replaced by an alkoxy group. The compounds of the present invention are also readily distinguished from those of Serial No. 257,873 by their different solubility characteristics and by their improved color stability. For example, the 2-dialkylamino-2,3-benzofuran-5-ols are readily soluble in dilute mineral acids while the 2-alkoxy derivatives are not. Therefore, in cases where an oil stabilized with the dialkyl-amino derivatives may be in contact with aqueous acid-solutions the 2-dialkylamino compounds would be extracted by the acid while the 2-alkoxy compounds of the present invention would not. Furthermore, the 2-alkoxy compounds are usually colorless or faintly yellow and remain so either alone or when admixed with edible and other oils. The 2-dialkylamino compounds, on the other hand, tend to darken more or less rapdily on standing either alone or in edible or other oils.

It is the principal object of the invention to produce a new class of chemical compounds represented by 3,3-dialkyl-2-alkoxy-2,3-dihydrobenzofuran-5 - ols containing an alkoxy group in the 2-position as referred to in the preceding paragraphs.

Another object is to produce substituted-5-benzofuranols which are excellent antioxidants for edible and other fats and oils and also useful as photographic developers and fungicides.

A further object is to provide an improved process for the production of 3,3-dialkyl-2-alkoxy-2,3-dihydrobenzofuran-5-ols in which high yields of the desired product may be obtained.

A still further object is to provide a new class of chemical compounds represented by the acetals of 3,3-dialkyl-2-alkoxy-2,3-dihydrobenzofuran-5-ols.

Other objects will appear hereinafter.

In accordance with the invention we have found that when a quinone of the formula

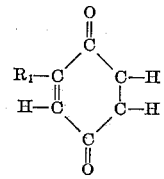

is treated with an enol ether of the formula

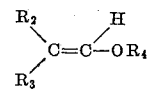

in the presence of a Lewis acid catalyst they react to give a novel substituted 2,3-dihydrobenzofuran-5-ol of the formula

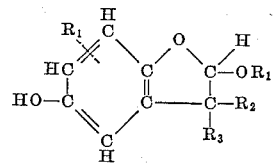

In the above formulae $R_1$ is hydrogen or alkyl and $R_2$, $R_3$ and $R_4$ are alkyl groups of 1–18 carbon atoms such as methyl, ethyl, propyl, isobutyl, tertiary butyl, n-pentyl, n-hexyl, 2-methylpentyl, 2,2-dimethylpentyl, dodecyl, octadecyl and the like. The preferred compounds are those in which the alkyl groups are lower alkyl by which term we mean to include those of 1–7 carbon atoms. It will be noted, from this structural formula and as explained above, that these compounds are characterized by the fact that they include an alkoxy group in the 2-position.

Quinones suitable for use in producing the novel 2,3-dihydrobenzofuran-5-ols of this invention are p-benzoquinone, toluquinone, tertiarybutyl quinone, naphthoquinone, chloroquinone, methoxyquinone and the like.

The enol ethers suitable for the production of our novel compounds are derived from aliphatic aldehydes having only one α-hydrogen atom. Examples of such aldehydes are isobutyraldehyde, 2-methylbutyraldehyde, 2-methyl valeraldehyde, 2-ethylhexanal and the like.

The reaction between the quinones and enol ethers as referred to above may be exemplified by the following illustrative equation.

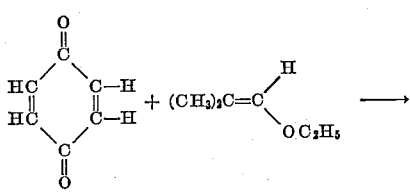

p-Benzo-quinone   Ethyl isobutenyl ether

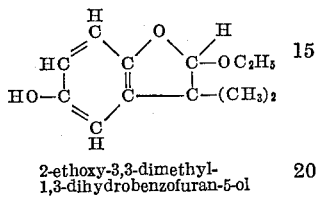

2-ethoxy-3,3-dimethyl-
1,3-dihydrobenzofuran-5-ol

Suitable Lewis acid catalysts for carrying out the reaction between quinone and enol ethers are boron-trifluoride, zinc chloride, stannic chloride, titanium tetrachloride and the like. However, boron-trifluoride is the preferred catalyst.

In the following examples and description we have set forth several of the preferred embodiments of our invention but they are included merely for purposes of illustration and not as a limitation thereof.

EXAMPLE I

To a stirred slurry of p-benzoquinone (54 g., 0.5 mole) in 500 ml. of ether containing ethyl isobutenyl ether (55 g., 0.55 mole) 2 ml. of boron-trifluoride etherate was added. The temperature of the mixture rose to 39° (reflux) in 10 minutes and was held at 34–38° for 15 minutes by external cooling. The mixture then stood at room temperature for 4 hours, and was then extracted with a solution of 30 g. of sodium hydroxide in 400 ml. of water. The aqueous extract was acidified with hydrochloric acid and extracted twice with 250 ml. portions of ether. Distillation of the ether extract gave 37.5 (36 percent) 3,3-dimethyl-2-ethoxy-2,3-dihydrobenzofuran-5-ol, B.P. 126–128° at 1 mm., which crystallized on standing, M.P. 73°. The reaction is illustrated by the following equation:

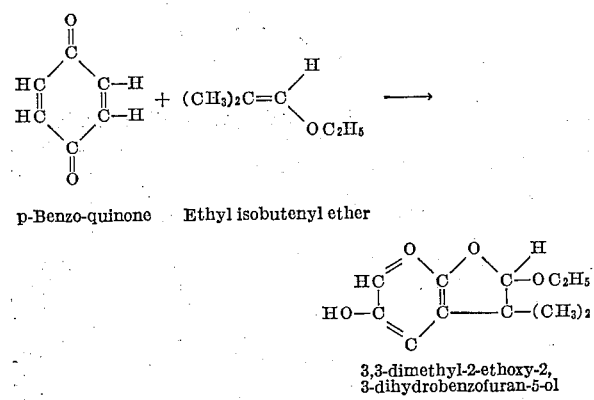

p-Benzo-quinone   Ethyl isobutenyl ether 3,3-dimethyl-2-ethoxy-2,
3-dihydrobenzofuran-5-ol

EXAMPLE II 3,3 - dimethyl - 2-n-butoxy-2,3-dihydrobenzofuran-5-ol was prepared employing the same procedure as described in Example I by reacting p-benzoquinone with butyl isobutenyl ether. The product had a boiling point of 135–137 at 1 mm., a refractive index of 1.5168, and was obtained in 35 percent yield. The equation for the reaction is

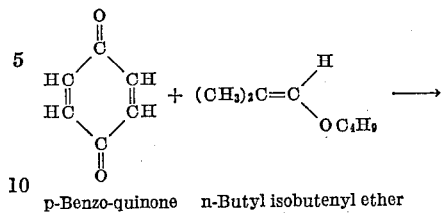

p-Benzo-quinone   n-Butyl isobutenyl ether

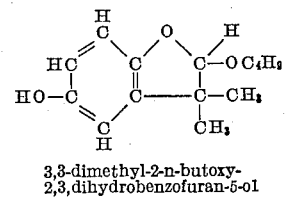

3,3-dimethyl-2-n-butoxy-
2,3,dihydrobenzofuran-5-ol

EXAMPLE III 3,3 - diethyl-2-ethoxy-2,3-dihydrobenzofuran-5-ol was prepared employing the same procedure as described in Example I by reacting p-benzoquinone with ethyl 2-ethyl-1-butenyl ether. The product had a boiling point of 128–132° at ca. 0.5 mm., and a refractive index of 1.5179. The reaction is

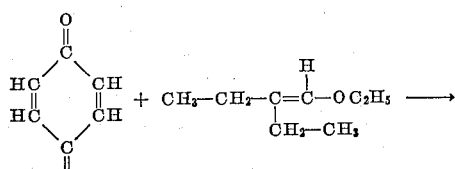

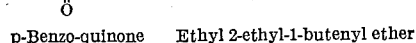

p-Benzo-quinone   Ethyl 2-ethyl-1-butenyl ether

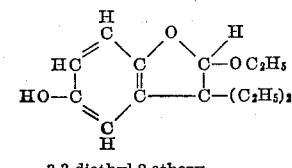

3-3-diethyl-2-ethoxy-
2,3-dihydrobenzofuran-5-ol

EXAMPLE IV

Proceeding as in Example I, a tert-butyl-3,3-dimethyl-2-ethoxy-2,3-dihydrobenzofuran-5-ol was prepared by reaction of tert-butyl benzoquinone with ethyl isobutenyl ether. The resulting product boiled within the range of 144–150° C. at approximately 0.5 mm. pressure. The position of the tert-butyl group in the compound was not determined but was assumed to be in the sixth position in the ring. The reaction is

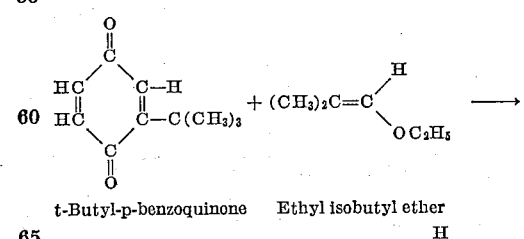

t-Butyl-p-benzoquinone   Ethyl isobutyl ether

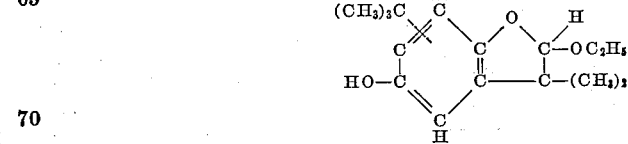

3,3-dimethyl-2-ethoxy-6 (or 7)-t-
butyl-2,3-dihydrobenzofuran-5-ol

The novel 3,3-dialkyl-2-alkoxy-2,3-dihydrobenzofuran-5-ols of our invention are useful as antioxidants for edible fats, edible and other oils. They are also useful as photographic developers and as fungicides.

In the working further with the above reaction we have found that when 3,3-dialkyl-2-alkoxy-2,3-dihydrobenzofuran-5-ols are prepared as described above, substantial quantities of the acetals resulting from addition of the benzofuranol to another mole of the enol ether are formed.

As will be evident from the equations and examples set forth below it is possible to isolate these acetals which are useful in their own right as antioxidants and also as starting materials for the preparation of further quantities of the 3,3-dialkyl-2-alkoxy-2,3-dihydrobenzofuran-5-ols. We have found that substantially better yields of the benzofuranols themselves are obtained when the reaction of the quinone and enol ether is carried out with 1:2 mole ratio of quinone to ether and the resulting product is hydrolyzed with dilute aqueous acid. The reaction for production of the 3,3-dialkyl-2-alkoxy-2,3-dihydrobenzofuran-5-ols by this improved procedure is exactly the same as described above but by adding another mole of the enol ether in the initial reaction mixture substantial quantities of the acetals of the 3,3-dialkyl-2-alkoxy-2,3-dihydrobenzofuran-5-ols are obtained. If it is desired to obtain the acetal itself from the reaction mixture this can be done by extraction of the reaction mixture with an aqueous base such as 10 percent sodium hydroxide to remove the base-soluble benzofuranol. The acetal then is obtained by distillation of the base-insoluble organic phase. Acidification of the basic aqueous extracts followed by extraction with ether and distillation gives the benzofuranol. On the other hand if it is desired to convert the content of acetal back to the 3,3-dialkyl-2-alkoxy-2,3-dihydrobenzofuran-5-ols, this is accomplished, as stated, by hydrolysis of the entire reaction mixture with dilute acid. The reactions involved in these transformations are the following:

(1)
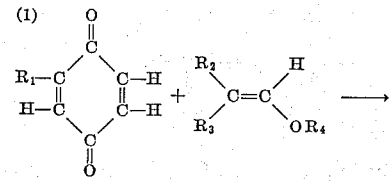
Alkylbenzoquinone  Enol ether

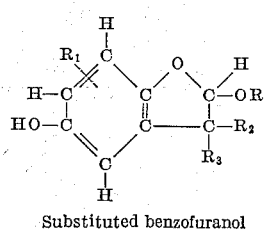
Substituted benzofuranol (2)
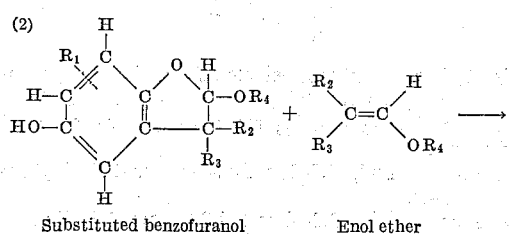
Substituted benzofuranol  Enol ether

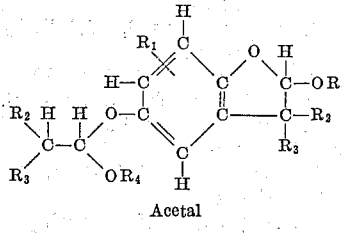
Acetal (3)
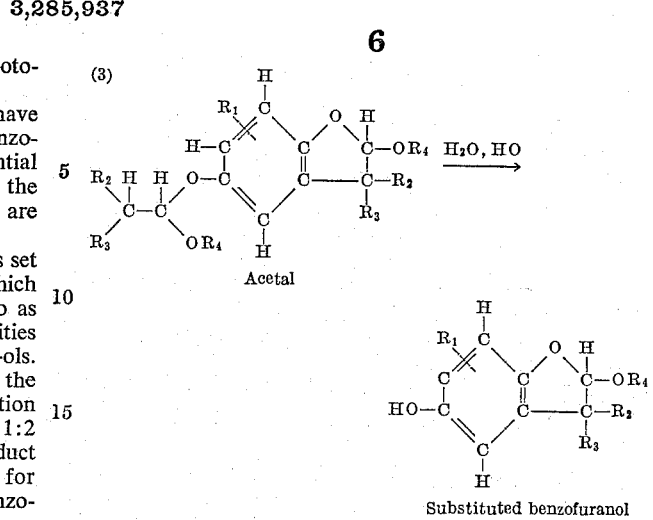

wherein $R_1$ is hydrogen or alkyl and $R_2$, $R_3$, and $R_4$ are alkyl groups of 1–18 carbon atoms such as methyl, ethyl, propyl, isobutyl, tertiary butyl, n-pentyl, n-hexyl, 2-methylpentyl, 2,2-dimethylpentyl, dodecyl, octadecyl and the like. The preferred compounds are those in which the alkyl groups are lower alkyl by which term we mean to includes those of 1–7 carbon atoms.

Acetal formation and separation as described above is illustrated by Examples V and VII. Since, even when one employs a 1:1 mole ratio of the quinone and enol ether a certain amount of acetal formation takes place, an increase in the amount of the desired 3,3-dialkyl-2-alkoxy-2,3-dihydrobenzofuran-5-ol may be obtained by hydrolyzing the acetal content back to the 3,3-dialkyl-2-alkoxy-2,3-dihydrobenzofuran-5-ols. This is illustrated by Examples VI, VIII and IX.

EXAMPLE V

To a mixture of methyl isobutenyl ether (43 g., 0.5 mole) and p-benzoquinone (27 g., 0.25 mole) in 300 ml. of ether was added 3 ml. of boron trifluoride etherate. Cooling was applied to maintain the temperature at 35–40°. After the exothermic reaction had subsided the mixture was allowed to stand for 2 hours after which time the solution was extracted three times with 100 ml. portions of 10 percent aqueous sodium hydroxide. Acidification of the aqueous extracts gave 15 g. of phenolic product, mostly 3,3-dimethyl-2-methoxy-2,3-dihydrobenzofuran-5-ol. Distillation of the ether solution after its extraction with base gave 21 g. (30 percent) of 2-methoxy-5-(1-methoxy-2-methylpropoxy)-2,3-dihydro-3,3-dimethylbenzofuran, B.P. 121–128° at 1 mm., $n_D^{20}$ 1.4998. Analysis showed 68.82 percent carbon and 8.80 percent hydrogen as compared with theoretical values of 68.6 and 8.6 respectively.

EXAMPLE VI

A similar run to that of Example V was made using 172 g. of methyl isobutenyl ether, 108 g. of benzoquinone and 600 ml. of ether. After the initial exothermic reaction, the ether was removed by distillation and the residue was stirred with a mixture of 750 ml. of water, 150 ml. of methanol, and 5 ml. of concentrated hydrochloric acid for 16 hours at room temperature. The organic material was extracted with ether and the extract distilled to give 112.5 g. (58 percent) of 3,3-dimethyl-2-methoxy-2,3-dihydrobenzofuran-5-ol, B.P. 116–119° at 0.75 mm., $n_D^{20}$ 1.5341.

EXAMPLE VII

In a manner like Example V, ethyl isobutenyl ether and p-benzoquinone gave 2-ethoxy-5-(1-ethoxy-2-methylpropoxy)-2,3-dihydro-3,3-dimethylbenzofuran, B.P. 125–130° at 1 mm., $n_D^{20}$ 1.5013.

EXAMPLE VIII

In a similar manner to Example VI ethyl isobutenyl ether and p-benzoquinone gave 3,3-dimethyl-2-ethoxy-2,3-dihydrobenzofuran-5-ol in 46 percent yield, B.P. 125–128° at 1 mm., M.P. 72–73°.

EXAMPLE IX

In a like manner to Example VI ethyl isobutenyl ether and toluquinone gave a 58 percent yield of 3,3,X-trimethyl-2-ethoxy-2,3-dihydrobenzofuran-5-ol, B.P. 120–130° at 0.5–0.6 mm. The position of the methyl group is not known with certainty, but it is probably largely in the 6-position.

EXAMPLE X

In a like manner to Example VI ethyl isobutenyl ether and t-butylquinone gave a 62 percent yield of X-t-butyl-3,3-dimethyl-2-ethoxy-2,3-dihydrobenzofuran - 5-ol, B.P. 130–135° at ca. 0.5 mm. which crystallized to a low-melting gummy solid on standing. Again, the t-butyl group is probably largely in the 6-position.

EXAMPLE XI

To a slurry of 1,4-naphthoquinone (39 g., 0.25 mole) in 350 ml. of ether containing 50 g. (0.5 mole) of ethyl isobutenyl ether was added 2 ml. of boron trifluoride etherate. The temperature of the mixture rose slowly to a maximum of 34° and the naphthoquinone went into solution. After 4 hours the ether was removed by distillation and the residue was stirred 16 hours with 250 ml. of water, 50 ml. of ethanol and 3 ml. of concentrated hydrochloric acid. The organic phase was taken up in ether and the ether removed by distillation leaving a residue of 58 g. of very viscous residue containing a substantial amount of 3,3-dimethyl-2-ethoxy-2,3-dihydronaphthofuran-5-ol.

As indicated above, the acetals of 3,3-dialkyl-2-alkoxy-2,3-dihydrobenzofuran-5-ols constitute a new class of chemical compounds which are useful themselves as antioxidants. Furthermore, if desired, these acetals, if separated from the reaction mixture, may be employed for the production of further quantities of the 3,3-dialkyl-2-alkoxy-2,3-dihydrobenzofuran-5-ols.

By obtaining a higher acetal content in the reaction mixture and subsequent hydrolysis of the mixture as explained above in accordance with our invention, it will also be seen that we have provided an improved process for the production of 3,3-dialkyl-2-alkoxy-2,3-dihydrobenzofuran-5-ols wherein increased yields of the 3,3-dialkyl-3-alkoxy - 2,3 - dihydrobenzofuran-5-ol component may be obtained.

Although the invention has been described in considerable detail with particular reference to certain preferred embodiments thereof, variations and modifications can be effected within the spirit and scope of the invention as described hereinabove, and as defined in the appended claims.

We claim:

1. A process of preparing 3,3-dialkyl-2-alkoxy-2,3-dihydrobenzofuran-5-ols of the formula

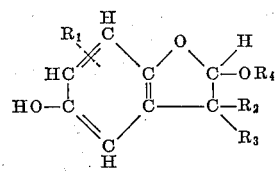

which comprises reaction in the presence of a catalyst selected from the group consisting of boron-trifluoride, zinc chloride, stannic chloride, and titanium tetrachloride, a p-benzoquinone having the formula

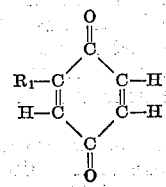

with an enol ether having the formula

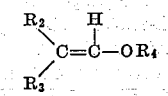

wherein $R_1$ is a substituent selected from the group consisting of hydrogen and alkyl groups of 1–18 carbon atoms and wherein $R_2$, $R_3$ and $R_4$ are alkyl groups of 1–18 carbon atoms.

2. A process of preparing 3,3-dialkyl-2-alkoxy-2,3-dihydrobenzofuran-5-ols of the formula

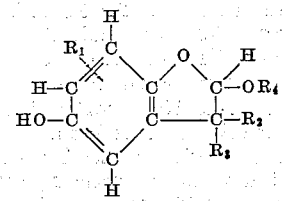

which comprises hydrolyzing by means of a dilute mineral acid, such as 5 percent hydrochloric acid, a 2-alkoxy-5-(1-alkoxy-2-alkylalkoxy) - 2,3-dihydro - 3,3-dialkylbenzofuran of the formula

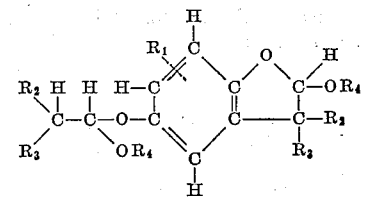

wherein $R_1$ is a substituent selected from the group consisting of hydrogen and alkyl groups of 1–18 carbon atoms and wherein $R_2$, $R_3$ and $R_4$ are alkyl groups of 1–18 carbon atoms.

3. As a chemical compound a 3,3-dialkyl-2-alkoxy-2,3-dihydrobenzofuran-5-ol having the structural formula

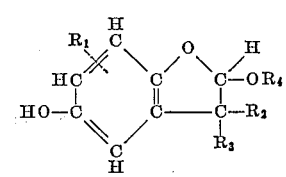

wherein $R_1$ is a substituent selected from the group consisting of hydrogen and alkyl groups of 1–18 carbon atoms and wherein $R_2$, $R_3$ and $R_4$ are alkyl groups of 1–18 carbon atoms.

4. The compound, 3,3-dimethyl-2-ethoxy-2,3-dihydrobenzofuran-5-ol.

5. The compound, 3,3-dimethyl-2-butoxy-2,3-dihydrobenzofuran-5-ol.

6. The compound, 3,3-diethyl-2-ethoxy-2,3-dihydrobenzofuran-5-ol.

7. The compound, 6(or 7)-tert-butyl-3,3-dimethyl-2-ethoxy-2,3-dihydrobenzofuran-5-ol.

8. The compound, 3,3-dimethyl-2-methoxy-2,3-dihydrobenzofuran-5-ol.

9. The compound, 3,3,6(or 7)-trimethyl-2-ethoxy-2,3-dihydrofuran-5-ol.

10. A process of preparing 2-alkoxy-5-(1-alkoxy-2- alkylalkoxy)-2,3-dihydro-3,3-dialkyl-benzofurans of the formula

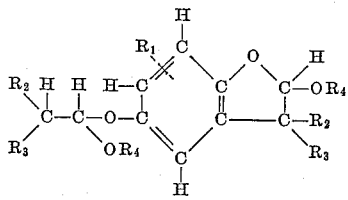

which comprises reacting in the presence of a catalyst selected from the group consisting of boron-trifluoride, zinc chloride, stannic chloride, and titanium tetrachloride, a p-benzoquinone having the formula

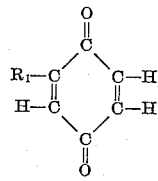

with two moles of an enol ether having the formula

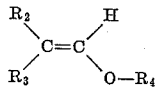

wherein $R_1$ is a substituent selected from the group consisting of hydrogen and alkyl groups of 1–18 carbon atoms and wherein $R_2$, $R_3$ and $R_4$ are alkyl groups of 1–18 carbon atoms.

11. As a chemical compound a 2-alkoxy-5-(1-alkoxy-2-alkylalkoxy)-2,3-dihydro-3,3-dialkylbenzofuran having the structural formula

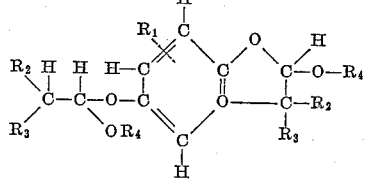

wherein $R_1$ is a substituent selected from the group consisting of hydrogen and alkyl groups of 1–18 carbon atoms and wherein $R_2$, $R_3$ and $R_4$ are alkyl groups of 1–18 carbon atoms.

12. The compound, 2-methoxy-5-(1-methoxy-2-methylpropoxy)-2,3-dihydro-3,3-dimethylbenzofuran.

13. The compound, 2-ethoxy-5-(1-ethoxy-2-methylpropoxy)-2,3-dihydro-3,3-dimethylbenzofuran.

References Cited by the Examiner

UNITED STATES PATENTS 3,184,457   5/1965   Brannock et al. ____ 260—346.2

NICHOLAS S. RIZZO, *Primary Examiner.*